March 24, 1931. N. D. LEVIN 1,797,475
COAL CUTTING MACHINE
Filed Oct. 23, 1922   5 Sheets-Sheet 3

Witnesses:
R. D. Nichols
Dudley T. Fisher

INVENTOR
Nils D. Levin
BY
N. H. Bliss
ATTORNEY

March 24, 1931.   N. D. LEVIN   1,797,475
COAL CUTTING MACHINE
Filed Oct. 23, 1922   5 Sheets-Sheet 5

Witnesses:
R. D. Nichols
Dudley T. Fisher

Inventor.
Nils D Levin
J. H. Bliss
Attorney.

Patented Mar. 24, 1931

1,797,475

UNITED STATES PATENT OFFICE

NILS D. LEVIN, OF COLUMBUS, OHIO, ASSIGNOR TO THE JEFFREY MANUFACTURING COMPANY, OF COLUMBUS, OHIO, A CORPORATION OF OHIO

COAL-CUTTING MACHINE

Application filed October 23, 1922. Serial No. 596,475.

The present invention relates to certain new and useful improvements in coal cutting machines, adapted to cut kerfs at the base of the mine wall in suitable position to facilitate breaking down the coal from its native bed.

In the mining of coal there have been developed a number of well known systems of operation, among which are the longwall, and the shortwall systems, each radically different from the other, and entailing radically different arrangement of chambers and passages of the mine. The system of mining employed in any particular location depends largely upon the character of the coal vein and of the overlying strata. The characteristics of the strata differ widely in different localities, and the variations occurring in relatively small distances are often so marked as to render it desirable to operate different sections of the same mine by different systems of mining. The machines which have been heretofore devised for use in either of these systems of mining have been unsuitable for operation in the other, and where it is desirable to operate different sections of a mine by different systems of mining, it has been necessary to duplicate machinery, with a consequent increase in investment.

It is the especial object of this invention to provide in a single mechanism, apparatus adapted to be operated in accordance with either the longwall or the shortwall system of mining, at the option of the operator.

A further object is to provide in a machine of the class described, an improved arrangement of parts whereby is attained increased efficiency and convenience of operation.

These and other objects will be fully disclosed in the following specification, reference being had to the accompanying drawings of which—

Like numerals refer to similar parts in the several figures.

As shown in the drawings by improved coal cutting machine comprises a main frame 1 having a flat bottom 2 adapted to rest upon and slide in any direction over the mine floor. At its central part there is formed a compartment 3 into which the motor 4 may be placed for the actuation of the cutting mechanism. The motor 4 may be of any preferred type suitable to the conditions under which the machine operates. For purposes of illustration I have shown an electric motor arranged to receive its actuating current through a suitable flexible conductor 5, from any convenient source of electric supply, and which may be controlled by controlling mechanism of the type well understood in the art. As these controlling devices form no part in the present invention their illustration and description at this time is not thought to be required. The driving shaft of the motor 4 is provided, at its forward end, with one member 6 of a jaw clutch coupling so formed that it will automatically engage the companion clutch member 7 when the motor is placed in the compartment 3. The clutch member 7 is fixed to the rearward end of a short power shaft 8 lying in the longitudinal central vertical plane of the machine and journaled in a suitable bearing 9 formed in the main frame 1.

At one end the main frame 1 is shaped to form an over hanging bracket 10 having a journal bearing 11 in which is supported the vertical shaft 12. To the vertical shaft 12 is keyed a master bevel gear 13 which engages the bevel pinion 14 fixed to the forward end of the power shaft 8. In order to secure greater quietness of operation the gears 13 and 14 are preferably spiral bevel gears wherein the teeth lie in planes inclined to the axes of rotation. Such gears possess a number of advantages over the straight bevel gears heretofore used, among which are greater strength, and smoother and quieter operation. An auxiliary journal bearing 15 formed in a gear case casting 16 which is bolted to the upper surface of the overhanging bracket 10, engages the upper end of the vertical shaft 12 to afford the necessary stability of support. A ball bearing 17, interposed between the upper end of the bearing 11 and the hub of the bevel gear 13, supports the weight of the vertical shaft and the parts attached thereto, and rollers 18 mounted upon the gear case casting 16 engage the upper surface of the master gear 13 to insure its engagement with the pinion 14.

Mounted at the lower end of the shaft 12 is a sprocket wheel 19 which engages the coal cutter chain 20 to drive it. The sprocket wheel 19 is arranged to be operatively connected to the shaft 12 by a pin clutch comprising the flange 21, fixed to the shaft 12, upon which the sprocket wheel is supported for free rotation concentric with said shaft, and a plurality of clutch pins 22 adapted to engage registering apertures in the sprocket wheel 19 and flange 21. The pins 22 are attached to a ring 23 which is slidable longitudinally of the shaft 12 under the control of the shifting levers 24 and 25 which are pivotally attached to the overhanging bracket 10. When the lever 25 is moved in one direction the pins 22 are moved downwardly to rigidly connect the sprocket wheel 19 with the shaft 12 to drive the cutter chain, and when said lever is moved in the opposite direction, the pins 22 are moved upwardly to disconnect said sprocket wheel from said shaft and prevent the actuation of said cutter chain.

Attached to the bracket 10 is a ring 26 upon which is supported a turn table 27, and to this turn table is attached the horizontally projecting elongated cutter frame 28 having guideways along its edges in which the coal cutter chain 20 is adapted to travel in the manner well known in the art. The cutter arm 28 may be locked in any preferred angular relation to the main frame by a coupling pin 29 adapted to be inserted in any one of a series of apertures 30 formed in the laterally projecting flanges 31 of the gear case casting 16, and a similar registering aperture formed in the turn table 27. The number and arrangement of the apertures 30 is such that the cutter arm 28 may be locked in either of a variety of positions to adapt the machine to operation under a large variety of conditions.

Fixed to the vertical shaft 12, immediately above the master gear 13, is a worm 32 which engages a worm wheel 33 fixed to a longitudinally extending shaft 34 supported in journal bearings formed in the gear case 16. The shaft 34 is connected through a pair of spur gears 35 and 36 with a longitudinally extending shaft 37, hereinafter referred to as the feed power shaft, which transmits power to the feeding mechanism mounted upon the main frame at the end remote from the cutting mechanism above described. The office of the spur gears 35 and 36 is to sufficiently offset the power feed shaft 37 to avoid the motor compartment 3 and permit lifting the motor 4 from the compartment 3 without disturbing other parts of the mechanism.

Fixed to the power shaft 37 near its outer end is a spur pinion 38 which engages a spur gear 39 keyed to the drum shaft 40 which extends longitudinally of the machine. Two similar winding drums 41 and 42 are mounted concentrically with the drum shaft 40, one at either side of the spur gear 39, and to these drums are fixed the flexible cables 43 and 44 respectively each adapted to be wound upon its respective drum, and to have its free end connected with any suitable abutment either outside of the machine or upon it. The drums 41 and 42 are associated with clutch mechanism of peculiar construction adapted to connect each drum with the drum shaft to wind its respective rope, to permit the unwinding of said rope under controlled frictional resistance, or to allow the drum to turn freely in either direction relative to the drum shaft.

This clutch mechanism comprises friction clutches of the well known multiple disc type arranged within the winding drums, having the driving members 45 and 46 and the driven members 47 and 48 adapted to be connected by the interengagement of the friction discs 49 and 50 in the manner well understood in the art. The driven members 47 and 48 of the friction clutches are arranged to be connected with the winding drums 41 and 42 by pin clutches comprising the longitudinally slidable clutch pins 51 and 52 secured respectively to the shifting rings 53 and 54 and adapted to engage registering apertures in the flanges of the driven members 47 and 48 and of the winding drums 41 and 42 respectively. Suitable shifting levers 55 and 56 are pivotally supported upon the frame of the machine, and engage the shifting rings 53 and 54 respectively to control their movement. The shifting levers 55 and 56 are provided with operating handles 57 and 58 positioned convenient to the hand of the operator, and by the manipulation of these handles 57 and 58 the clutch pins 51 and 52 may be caused to engage the winding drums to connect them with their respective friction clutches, or they may be withdrawn from such engagement to permit rotation of the drums relative to the friction clutches and the unwinding of their respective ropes with a minimum of frictional resistance. A hand wheel 59 is screw threaded to the hub 60 of the driving member 46, and rotation of this wheel relative to said hub will apply pressure, through the pressure pins 60', to the friction discs 50. A second hand wheel 61 is screw threaded to a sleeve 62, keyed to the shaft 40, and rotation of this hand wheel relative to the shaft 40 will apply pressure through the pressure pins 63 to the friction discs 49. By manipulation of the hand wheels 59 and 61, the winding drums 42 and 41 may be frictionally connected with the drum shaft 40 to rotate at a speed corresponding to that of the shaft to wind the ropes 44, 43, and the drums may be permitted to revolve in the unwinding direction under the retarding influence of the friction discs 50 and 49, and by the manipulation of the hand wheels 59 and 61 the unwinding rotation of the drums may be frictionally controlled.

The drum shaft 40 is connected through a pair of spur gears 64 and 65 with a parallel counter shaft 66, and upon this counter shaft are rotatably mounted two spur pinions 67 and 68 each of which is provided with jaw clutch teeth adapted to engagement with the teeth of the jaw clutch members 69 and 70 slidable longitudinally of the counter shaft 66. Spur gear 64 has an integral sleeve keyed to an encircling sleeve integral with the driving member of clutch 47, and therefore the rotation of pinions 67 and 68 is controllable through clutch 47. The clutch members 69 and 70 are controlled by the pull rods 71 and 72 to which are fixed the operating handles 73 and 74 within convenient reach of the operator. The spur pinions 67 and 68 engage respectively with the spur gear wheels 75 and 76 fixed to the winding drums 41 and 42, and when the clutches 69 and 70 are appropriately adjusted power may be transmitted from the feed power shaft 37 through the drum shaft 40 and counter shaft 66 to drive the winding drums 41 and 42 at a speed materially less than that of the drum shaft 40.

By suitable manipulation of the devices above described either of the winding drums 41 or 42 may be directly connected with the drum shaft 40 to wind its respective rope at a relatively high speed, or it may be connected with the counter shaft 66 to wind its rope at a relatively slow speed, and either rope may be permitted to unwind under a frictionally controlled resistance, or it may be permitted to unwind without such resistance.

Rotatably mounted upon the feed power shaft 37 are two spur pinions 77 and 78 which are arranged to engage the spur gears 75 and 76 fixed to the winding drums. These pinions 77 and 78 are formed integral with concentric cylindrical extensions 79 and 80, and these cylindrical extensions are encircled by the friction brake bands 81 and 82. These friction brake bands are respectively provided with clamping screws 83 and 84 to cause them to grip their respective cylindrical extensions, and the clamping screws 83 and 84 are suitably anchored to the frame 1 of the machine to prevent its rotation with the shaft 37. Each clamping screw is provided with a suitable hand wheel by the manipulation of which a retarding force can be applied to either of the winding drums to resist its rotation independently of the clutch mechanism above described.

Suitable guide sheaves 85 and 86 are provided along the sides of the machine frame in position to guide the feed ropes 43 and 44 to their respective winding drums, and similar guide sheaves 87 and 88 are provided at the end of the machine so that either cable may be carried around the machine to exert a draft in any desired direction from any preferred point upon the machine frame. A guide sheave 89 mounted upon a removable bracket 90, which may be attached to the turn table 27 in either of a number of positions, is provided, and by means of this guide sheave the cable may be so directed as to exert its draft in any preferred direction from positions at the base of the cutter arm.

The turn table 27 is circular in outline, and around its edge there is formed a groove 91 adapted to engage the feed rope 43 by which the turn table may be rotated to cause the cutter chain 20 to engage the coal to cut it. Means is provided in the lug 92 upon the cutter arm for the attachment of the feed rope for this purpose. By the rotation of the turn table 27 the cutter arm 28 may be turned, in horizontal planes, from a position in which it projects from one side of the main frame at an angle materially in advance of a right angle, across the end of the machine, to a position in which it projects from the opposite side of the main frame at any angle materially in advance of a right angle.

The cutter chain 20 may also be forced against the coal to cut it by bodily movement of the machine relative to the coal face, in such case the cutter arm is locked in suitable angular relation to the main frame in the manner above described, and the feed rope attached to a suitable abutment external of the machine.

In the drawings I have shown my improved coal cutting machine adjusted for cutting across the coal face from right to left. For operation from left to right it is only necessary to reverse the direction of the motor 4, turn the cutter bits of the mining machine chain 20 in the opposite direction, rewind the feed ropes 43 and 44 so that they will be led from their respective winding drums over the guide sheaves 86 instead of the guide sheaves 85, and transfer the removable guide sheave 89 to the opposite side of the machine. The further manipulation of the machine is as when cutting from right to left.

In mines worked by the shortwall system the mining machine is transferred from one working place to another upon a suitable truck from which it may be unloaded to the mine floor in proper relation to the coal face for beginning the cutting operation.

Figure 1:
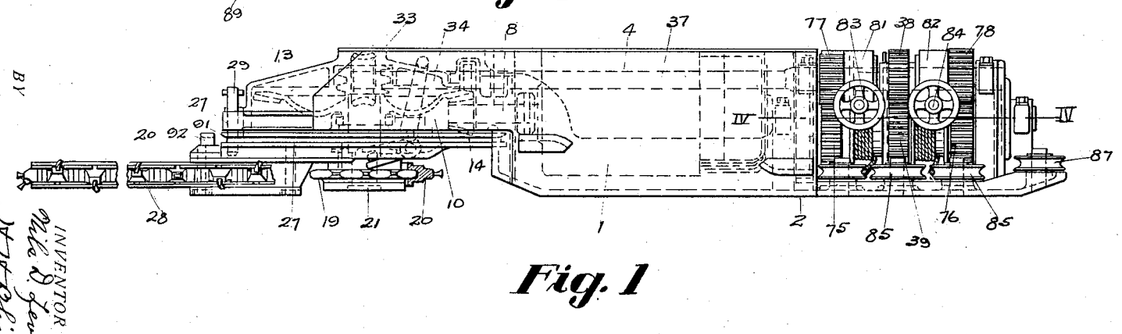
Fig. 1 is a side elevation of the preferred embodiment of my invention.
Figure 2:
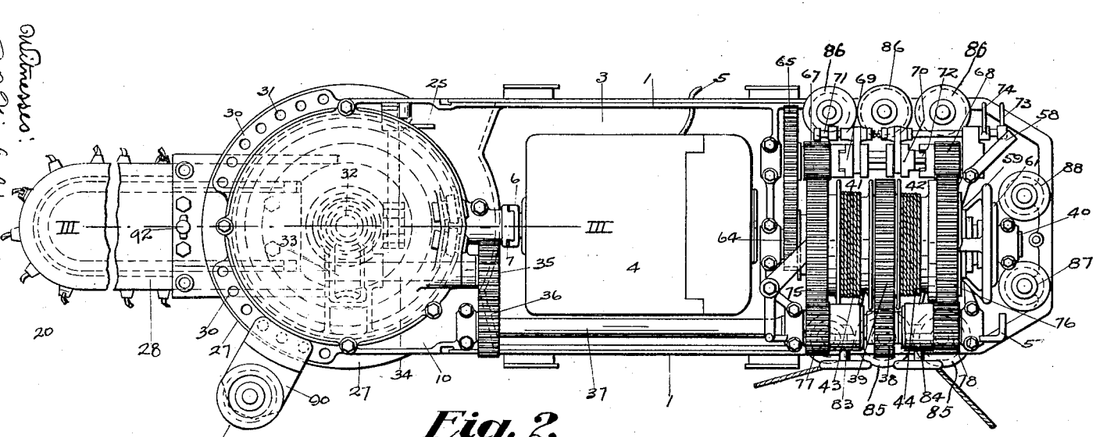
Fig. 2 is a plan view of the machine illustrated in Fig. 1.
Figure 3:
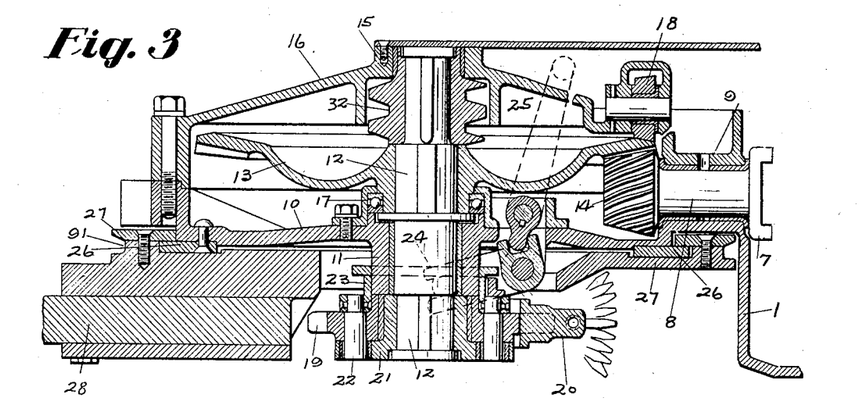
Fig. 3 is a sectional view taken along the line III—III of Fig. 2.
Figure 4:
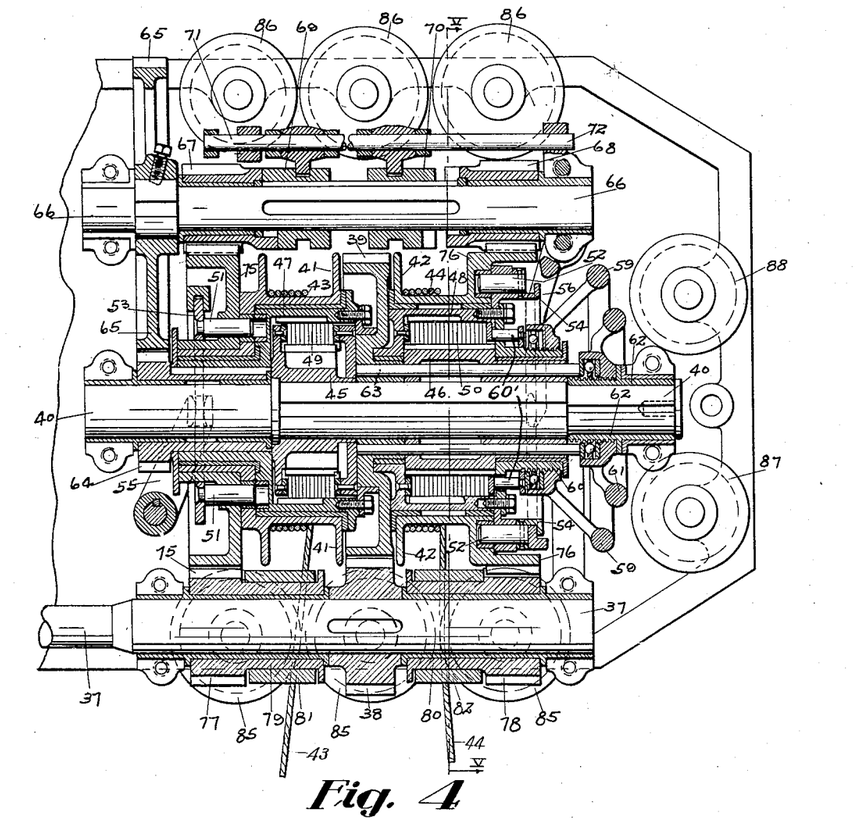
Fig. 4 is a sectional view taken along the line IV—IV of Fig. 1.
Figure 5:
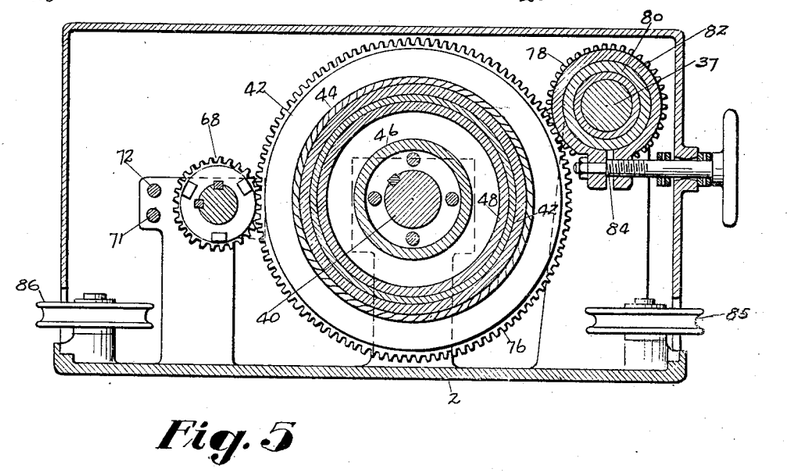
Fig. 5 is a sectional view taken along the line V—V of Fig. 4.
Figure 6:
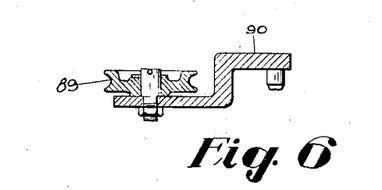
Fig. 6 is a fragmentary detail of the removable guide sheaves.
Figure 7:
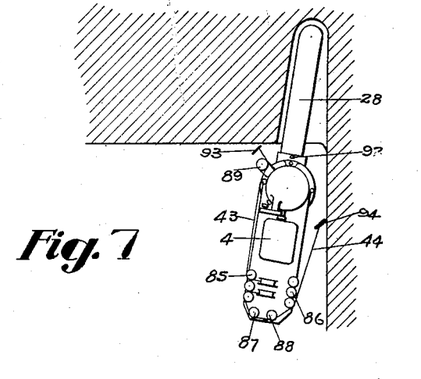
Figs. 7 to 15 inclusive are diagrams illustrating some of the many methods of operation for which the machine is adapted.

In Fig. 7, I have illustrated one method of making the sumping or entering cut. Preparatory to this operation the mining machine is placed adjacent the right hand rib, with the inner end of the cutter arm in close proximity to the coal face. The feed rope 43 is then drawn out from its winding drum, passed around the guide sheave 89, and attached to a suitable anchor jack 93 positioned adjacent the coal face. The feed rope 44 is then drawn out from its winding drum, passed around the guide sheaves 87 and 88, and secured to an anchor jack 94 adjacent the right hand rib at a suitably spaced distance from the coal face. Manipulation of the controlling devices for the winding drums will cause the ropes 43 and 44 to be wound so as to draw the machine forward to thrust the cutter bar 28 longitudinally into the coal.

Figure 8:
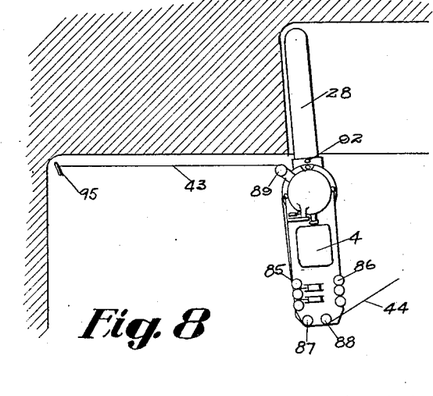

After the completion of the sumping cut the anchor jack 93 will be removed to a position adjacent the left hand rib, as illustrated at 95 in Fig. 8, and the feed rope 43 after passing around the guide sheave 89 will be attached thereto. The feed rope 43 will then be wound upon its winding drum 41, and the feed rope 44 paid out under the frictional resistance of the clutch mechanism within the drum 42 and the machine caused to advance across the face of the room extending along lines substantially perpendicular to the coal face.

Figure 10:
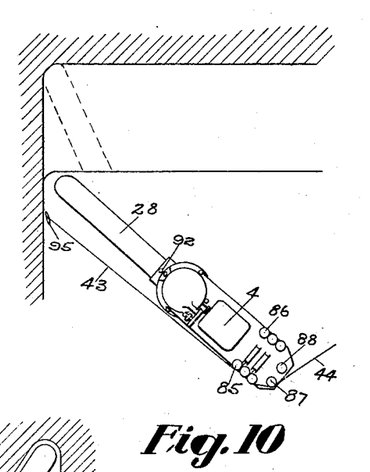

Because of the position of the anchor jack 95 outside of the coal face, and the unavoidable projection of the sides of the mining machine frame beyond the advancing side of the cutter bar 28, it is impossible to move the cutter bar into alignment with the left hand rib of the mine room. In order to maintain a straight rib wall the method of withdrawing the cutter arm illustrated in Fig. 10 is resorted to. When the mining machine has advanced as far towards the left, as is conveniently possible to the position shown by the dotted lines in Fig. 10, the feed mechanism is manipulated to wind the feed rope 44 to pull upon the outer end of the machine frame, and to permit the unwinding of the feed rope 43 under frictional resistance. The machine may thus be caused to swing about the guide sheave 89 and the anchor jack 95 as fulcrums, and to be withdrawn as indicated in Fig. 10.

Figure 9:
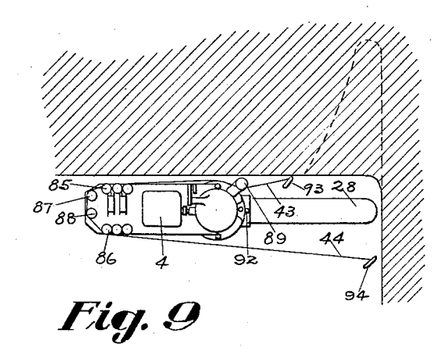

It sometimes happens that the presence of roof supporting timbers or piles of refuse material, render the method of sumping as shown in Fig. 7 undesirable, and the method illustrated in Fig. 9 may be resorted to when conditions render it preferable. As here illustrated the mining machine may be placed closely adjacent and parallel to the coal face with the inner end of the cutter bar 28 in close proximity with the right hand rib. The feed rope 43 is then attached to an anchor jack 93 suitably positioned adjacent the coal face, and the feed rope 44 is passed around the guide sheaves 85, 87, and 88, and attached to the anchor jack 94 suitably positioned adjacent the right rib. Proper application of tensile strains upon the ropes 43 and 44, effected by manipulation of the friction clutches within the winding drums, will cause the mining machine to swing about the anchor jack 93 as a fulcrum, producing a sumping cut such as is shown by the dotted lines in Fig. 9.

Figure 11:
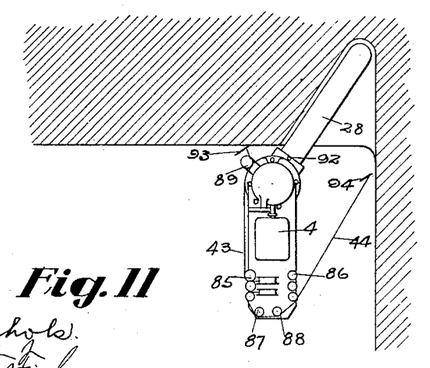

Another method of sumping is illustrated in Fig. 11 which is suitable for rooms having the mine tracks positioned at one side of the room. In such case the mining machine is unloaded directly in front of the truck along lines perpendicular to the coal face. The cutter arm 28 is then turned to such an angle that its inner end extends to the right hand rib. The feed rope 43 is then attached to the anchor jack 93 adjacent the coal face and the feed rope 44 passed around the guide sheaves 87 and 88 and attached to the anchor jack 94 adjacent the rib. The feeding devices are then actuated to cause the machine to be pulled bodily forward along lines perpendicular to the coal face, forming a sumping cut such as is illustrated in Fig. 11.

Figures 12, 13:
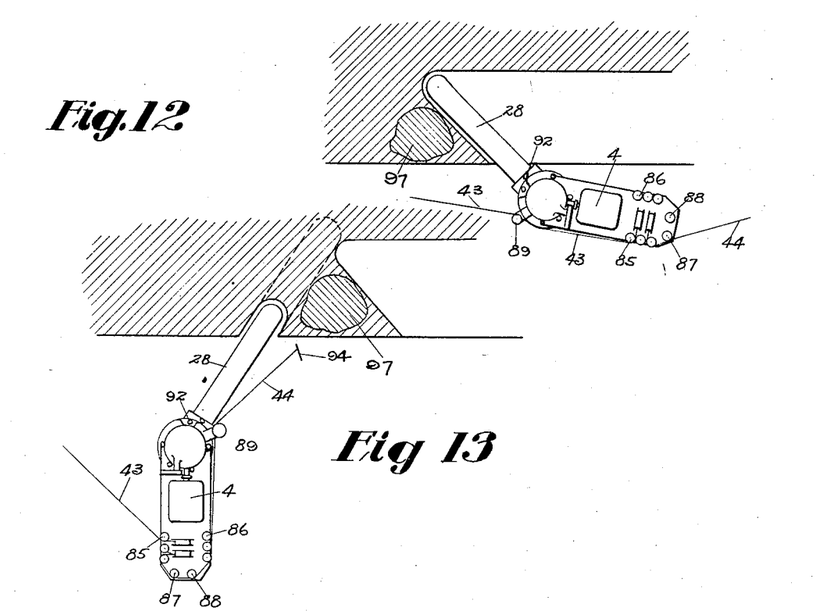

Under some conditions it is desirable to operate the machine as a shortwall machine when roof conditions require the positioning of roof supporting timbers 96 relatively close to the coal face. In such a case the cutter arm 28 may be unlocked to permit rotation of the main frame into such angular relation with the coal face that it will pass between the roof supporting timbers and the coal face, as illustrated in Fig. 12. After the desired angular relation is established between the cutter arm 28 and the mining machine frame 1, the locking devices may be again adjusted to secure these parts in the desired angular relation, and the operation proceeds as in Fig. 8.

There are sometimes present in the coal vein boulders such as are shown at 97 in Fig. 13, of stone or other hard substance, which cannot be easily cut by the bits of the mining machine chain. When such a boulder is encountered the strain upon the feed rope 43 may be reduced to stop the advance of the machine and the strain upon the tail rope 44 may be increased to swing the outer end of the frame rearwardly, causing the inner end of the cutter arm to advance behind the boulder 97. The strain upon the feed rope 43 may then be further reduced to cause the withdrawal of the cutter arm 28 from the kerf, after which the machine may be moved to a new advanced position, and turned to an angular relation with the coal face inclined rearwardly of the general direction of cutting. By suitable manipulation of the feed mechanism the cutter arm may then be thrust longitudinally into the coal, as illustrated in Fig. 13, to completely cut around the boulder 97 after which the cutting will advance as above described.

Figure 14:
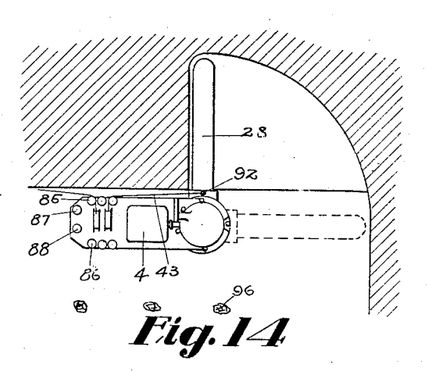
Figure 15:
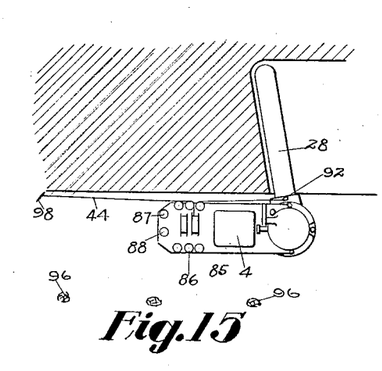

In Fig. 14 there is illustrated one method of forming the sumping or entering cut when operating in the longwall system of mining. By this method the mining machine, with the cutter arm 28 extending longitudinally in its central position, is placed adjacent the mine wall and parallel thereto. The feed rope 43 is then drawn out from the winding drum placed in the groove 91 upon the edge of the turn table 27, and attached to the stud 92 upon the cutter arm. Tension upon the feed rope will then cause the cutter arm to swing about its pivot to force the cutting mechanism into the coal to cut it. After the cutter bar has been turned to the desired angular relation with the coal face it may be locked in that position by the locking pin 29, or it may be held against retrograde movement by the feed rope 43 under the influence of the brake bands 81. In the last event the feed rope 44 will be attached to a suitable anchor jack 98 positioned adjacent the working face in advance of the machine and its winding drum will be actuated to move the machine as illustrated in Fig. 15.

Owing to the provision of two feed ropes 43 and 44 each of which is adapted to be wound at a relatively high speed or a relatively low speed, to be unwound against frictional resistance, or to be unwound without such resistance, my improved mining machine is adapted to an exceedingly wide range of operation in either the longwall or shortwall systems of mining.

What I claim, is:

1. In a mining machine, the combination of a main frame, a kerf cutter, power mechanism, driving connections between said power mechanism and said kerf cutter, feeding and guiding mechanism comprising two winding drums disposed side by side, a winding rope for each drum, a shaft common to both drums upon which said drums are loosely mounted, driving means fixed to said drum shaft between said drums, a connection between said power mechanism and said driving means, direct frictional connections and indirect connections including positive clutches between said driving means and said drums to effect the rotation of either, or the simultaneous rotation of both of said drums in a rope winding direction at either of two speeds.

2. In a mining machine, the combination of a main frame, a kerf cutter pivotally mounted thereon, power devices mounted thereon, a draft device adapted to swing said kerf cutter relatively to said main frame or to move the main frame over the mine floor when connected to an external abutment, a drum shaft mounted on said main frame, a connection between said power devices and said drum shaft, a freely rotatable winding drum for said draft device on said drum shaft, optionally controlled clutch devices positively to connect said drum with said drum shaft, and optionally controlled friction clutch devices to connect said drum with said power shaft to rotate said drum for winding or to resist unwinding rotation of said drum.

3. In a mining machine, the combination with a main frame adapted to rest upon and slide in any direction over the mine floor, of an elongated kerf cutter projecting horizontally therefrom, power devices upon the main frame to actuate the kerf cutter, a shaft mounted upon the main frame and connected with the power devices, two winding drums mounted for free rotation upon said shaft, controllable means to connect either or both of said drums to said shaft to revolve at the same speed therewith or to resist the revolution of said drums in the opposite direction, a supplemental shaft mounted upon said main frame connected with said power devices, pinions upon said supplemental shaft mounted for free rotation relative thereto, gears connected to said winding drums and engaging said pinions, and means to connect either or both of said pinions with said supplemental shaft to rotate said drums at a speed different from the speed of the first mentioned shaft, and a rope windable upon each drum adapted to cooperate with suitable abutments external of the machine as and for the purpose set forth.

4. In a mining machine, the combination of a main frame, a kerf cutter mounted thereon, a power device carried thereby, a drum shaft mounted on said frame, driving connections between said power device and said drum shaft, a plurality of freely rotatable winding drums on said drum shaft and each having a haul rope, optionally controlled independent means to connect each of said drums with said drum shaft for winding said haul ropes at a relatively slow speed, said means including positive clutches and optionally controlled means for frictionally and independently connecting each of said drums with said drum shaft for winding at a relatively fast speed or for retarded unwinding of said haul ropes.

5. In a mining machine, the combination of a main frame, a kerf cutter mounted thereon, a power device carried thereby, a drum shaft mounted on said frame, driving connections between said power device and said drum shaft, a plurality of freely rotatable winding drums on said drum shaft and each having a haul rope, optionally controlled independent positive clutch members to connect each of said drums with said drum shaft for winding said haul rope, and optionally controlled friction clutch members independently to connect each of said drums with said drum shaft for winding or for retarded unwinding of said haul ropes.

6. In a mining machine, the combination of a main frame, a kerf cutter mounted thereon, a power device carried thereby, a power transmission shaft mounted on said frame, a drum shaft mounted on said frame, a counter shaft mounted on said frame, a freely rotatable winding drum on said drum shaft having a haul rope, driving connections from said power shaft to said drum shaft and said counter shaft, counter driving connections from said counter shaft to said drum, optionally controlled means positively to connect said drum through said counter driving connections for rotation to wind said haul rope at a speed different from that of the drum shaft, and means frictionally to connect said drum with said drum shaft for winding or retarded unwinding of said haul rope.

7. In a mining machine, the combination of a main frame, a kerf cutter pivotally mounted thereon, power devices mounted thereon, draft devices adapted to swing said kerf cutter relatively to said main frame, or to move the main frame over the mine floor when connected to an external abutment, a drum shaft mounted on said main frame, a plurality of gears on said drum shaft, a plurality of winding drums for said draft devices mounted on said drum shaft and each adapted to be driven by one of said gears, optionally controlled positive clutch members interposed between the respective gears and said power devices, another gear on said drum shaft in connection with said power devices, and optionally controlled means frictionally and independently to connect said other gear with a selected drum.

8. In a mining machine, the combination of a main frame, a kerf cutter mounted thereon, a power device carried thereby, a drum shaft mounted on said frame, a plurality of gears on said drum shaft, driving connections between said power devices and said gears, a plurality of winding drums on said drum shaft each adapted to be driven by a respective gear and each having a haul rope, said driving means including optionally controlled positive clutch members whereby the drums may be driven independently for winding said haul ropes, and optionally controlled frictional clutch connections between each of said drums and said drum shaft for winding or for retarded unwinding of said haul ropes.

9. In a mining machine of the class described, the combination with a main frame adapted to rest upon and slide in any direction over the mine floor, of an elongated kerf cutter projecting from said frame, power devices upon the frame comprising a horizontally extending shaft, two winding drums mounted upon said shaft for free rotation thereon, and clutch mechanism on said shaft adapted to connect either or both of said winding drums directly to said shaft to rotate therewith or indirectly with said shaft to rotate thereon in the same direction but at reduced speed.

10. In a mining machine of the class described, the combination with a main frame adapted to rest upon and slide in any direction over the mine floor, of an elongated kerf cutter projecting horizontally from said frame, power devices upon the frame comprising a horizontally extending shaft, two winding drums mounted upon said shaft for free rotation relative thereto, and clutch mechanism adapted to connect either or both of said winding drums directly to said shaft to rotate therewith or indirectly with said shaft to rotate thereon in the same direction but at reduced speed or to permit their rotation in the opposite direction under optionally controlled resistance or to permit their rotation without said resistance as and for the purpose set forth.

11. In a mining machine, the combination with a main frame having an elongated kerf cutter projecting horizontally therefrom, feeding mechanism comprising a winding drum, a rope windable thereon adapted to cooperate with an external abutment to bodily move the machine over the mine floor, and guiding mechanism comprising a winding drum mounted upon the main frame, a rope windable thereon and adapted to be connected to an abutment external of the machine, optionally controlled transmission devices arranged to connect either or both of said drums with the power devices of the machine to wind the respective ropes at either of two speeds, a rotary member outside of the trains of said transmission devices geared to each of said winding drums, and controllable friction devices adapted to resist the rotation of said rotary members thereby resisting the unwinding of the ropes.

12. In a mining machine, the combination with a main frame adapted to rest upon and slide in any direction over the mine floor, of an elongated kerf cutter projecting horizontally therefrom, power devices upon the main frame to actuate the kerf cutter, a shaft mounted upon the main frame and connected with the power devices, two winding drums mounted for free rotation upon said shaft, controllable means to connect either or both of said drums to said shaft to revolve at the same speed therewith, means to cause the rotation of either or both of said drums in the same direction but at a speed different from that of said shaft, means to permit the rotation of either or both of said drums in the opposite direction under controlled resistance, and a rope windable upon each drum and adapted to cooperate with suitable abutments external of the machine as and for the purpose set forth.

13. In a mining machine, the combination with a main frame adapted to rest upon and slide in any direction over the mine floor, of an elongated kerf cutter projecting horizontally therefrom, power devices upon the main frame to actuate the kerf cutter, a shaft extending horizontally on said main frame and connected with the power devices, two winding drums mounted for free rotation upon said shaft, means to operatively connect either or both of said drums with said shaft to revolve therewith, other means to resist the rotation of either or both of said drums in the opposite direction, and a rope windable upon each drum adapted to be connected to suitable abutments external of the machine to move and guide the machine as and for the purpose set forth.

14. In a mining machine, the combination with a main frame adapted to rest upon and slide in any direction over the mine floor, of an elongated kerf cutter projecting horizontally therefrom, power devices upon the main frame to actuate the kerf cutter, a shaft extending horizontally on said main frame and connected with the power devices, two winding drums mounted for free rotation upon the shaft, means to operatively connect either or both of said drums to said shaft to revolve at the same speed therewith, means to connect either or both of said drums with said shaft to revolve in the same direction but at a speed different from that of said shaft, means to permit the rotation of either or both of said drums in the opposite direction under controlled resistance, and a rope windable upon each drum and adapted to cooperate with suitable abutments external of the machine as and for the purpose set forth.

15. In a mining machine comprising a main frame, a kerf cutter mounted thereon, and a motor for actuating the kerf cutter, the combination with a shaft operatively connected with said motor, of a winding drum mounted for free rotation upon said shaft, a rope connected to said drum, optionally controllable means to connect said drum with said shaft to revolve therewith in a rope winding direction, optionally controllable means actuated by said shaft to cause the rotation of said drum in a rope winding direction at a speed other than the speed of said shaft, and optionally controllable means mounted independently of said shaft and operatively connected with said drum to retard its rotation in a rope unwinding direction as and for the purpose set forth.

16. In a mining machine comprising a main frame, a kerf cutter mounted thereon, and a motor for actuating the kerf cutter, the combination with a power shaft operatively connected with said motor, of a drum shaft extending in spaced parallelism with said power shaft and operatively connected therewith, two winding drums mounted for free rotation upon the drum shaft, a rope connected to each of said drums, optionally controllable means to connect either or both of said drums with said drum shaft to revolve therewith in a rope winding direction, rotary members mounted for free rotation upon said power shaft and operatively connected with said drums, and optionally controlled means to retard the rotation of either or both of said rotary members to thereby retard the rotation of either or both of said drums in a rope unwinding direction.

17. In a mining machine comprising a main frame, a kerf cutter mounted thereon, and a motor for actuating the kerf cutter, the combination with a power shaft operatively connected with said motor, of a drum shaft extending in spaced parallelism with said power shaft and operatively connected therewith, two winding drums mounted for free rotation upon the drum shaft, a rope connected to each of said drums, optionally controllable means to connect either or both of said drums with said drum shaft to revolve therewith in a rope winding direction, optionally controllable means actuated by said drum shaft to cause the rotation of either or both of said drums in a rope winding direction at speeds other than the speed of said drum shaft, rotary members mounted for free rotation upon said power shaft and operatively connected with said drums, and optionally controllable means to retard the rotation of either or both of said rotary members and thereby retard the rotation of either or both of said drums in a rope unwinding direction.

18. In a mining machine, the combination of a main frame, a kerf cutter, power mechanism, and driving connections between said power mechanism and said kerf cutter, feeding and guiding mechanism comprising two winding drums arranged side by side, a winding rope for each drum, driving means mounted between and common to both drums actuated by said power mechanism, direct and indirect connections between said driving means and said drums to effect the rotation of either or the simultaneous rotation of both of said drums in a rope winding direction at either of two speeds or each at a different speed, and independently controllable means for each drum to retard the rotation of either or both drums in a rope unwinding direction.

19. In a mining machine, the combination of a main frame, a kerf cutter, power mechanism, driving connections between said power mechanism and said kerf cutter, feeding and guiding mechanism comprising a pair of winding elements, flexible draft means for cooperation with said elements, a common shaft on which said elements are mounted, plural speed transmission means between said power mechanism and said winding elements to drive the latter in the winding direction at a relatively slow or at a relatively fast speed, said transmission means including a countershaft parallel to the winding element and intermeshing gears on the two shafts, and controllable friction means in the winding element driving connections operable to control the rotation of said elements during operation at either winding speed.

20. In a mining machine, the combination of a main frame, a kerf cutter, power mechanism, driving connections between said power mechanism and said kerf cutter, feeding and guiding mechanism comprising a pair of winding elements, flexible draft means for cooperation with said elements, a common shaft on which said elements are mounted, plural speed transmission means between said power mechanism and said winding elements to drive the latter in the winding direction at a relatively slow or at a relatively fast speed, said transmission means including a countershaft parallel to the winding element and intermeshing gears on the two shafts, controllable friction means in the winding element driving connections operable to control the rotation of said elements during operation at either winding speed, and means external to the winding element driving connections for braking one of said elements while the other is driven.

21. In a mining machine, the combination of a main frame, a kerf cutter, power mechanism, driving connections between said power mechanism and said kerf cutter, feeding and guiding mechanism comprising a pair of winding elements, flexible draft means for cooperation with said elements, a common shaft on which said elements are mounted, plural speed transmission means between said power mechanism and said winding elements to drive the latter in the winding direction at a relatively slow or at a relatively fast speed, said transmission means including a countershaft parallel to the winding element and intermeshing gears on the two shafts, controllable friction means in the winding element driving connections operable to control the rotation of said elements during operation at either winding speed, and means external to the winding element driving connections for braking one of said elements while the other is driven at either speed.

22. In a mining machine, the combination of a main frame, a kerf cutter, power mechanism, driving connections between said power mechanism and said kerf cutter, feeding and guiding mechanism comprising a pair of winding elements, flexible draft means for cooperation with said elements, a common shaft on which said elements are mounted, controllable friction clutch means for connecting said elements to said shaft to rotate therewith in a winding direction or to rotate in an unwinding direction under frictional resistance, and driving mechanism interposable between said shaft and elements to drive the latter in a winding direction at a speed other than that of the shaft.

23. In a mining machine, the combination of a main frame, a kerf cutter, power mechanism, driving connections between said power mechanism and said kerf cutter, feeding and guiding mechanism comprising a pair of winding elements, flexible draft means for cooperation with said elements, a common shaft on which said elements are mounted, controllable friction clutch means for connecting said elements to said shaft to rotate therewith either singly or simultaneously in a winding direction or to rotate in an unwinding direction under frictional resistance, and driving mechanism interposable between said shaft and elements to drive the latter in a winding direction at a speed other than that of the shaft.

24. In a mining machine, the combination of a main frame, a kerf cutter, power mechanism, driving connections between said power mechanism and said kerf cutter, feeding and guiding mechanism comprising a pair of winding elements, flexible draft means for cooperation with said elements, a common shaft on which said elements are mounted, controllable friction clutch means for connecting said elements to said shaft to rotate therewith in a winding direction or to rotate in an unwinding direction under frictional resistance, and driving mechanism interposable between said shaft and elements to drive the latter in a winding direction either singly or simultaneously at a speed other than that of the shaft.

25. In a mining machine, the combination of a main frame, a kerf cutter, power mechanism, driving connections between said power mechanism and said kerf cutter, feeding and guiding mechanism comprising a pair of winding elements, flexible draft means for cooperation with said elements, a common shaft on which said elements are mounted, controllable friction clutch means for connecting said elements to said shaft to rotate therewith either singly or simultaneously in a winding direction or to rotate in an unwinding direction under friction resistance, and driving mechanism interposable between said shaft and elements to drive the latter in a winding direction either singly or simultaneously at a speed other than that of the shaft.

26. In a mining machine, the combination of a main frame, a kerf cutter, power mechanism, driving connections between said power mechanism and said kerf cutter, feeding and guiding mechanism comprising a pair of winding elements, flexible draft means for cooperating with said elements, and plural speed driving connections for said winding elements whereby either may be driven at one speed while the other is simultaneously driven at another.

27. In a mining machine, the combination of a main frame, a kerf cutter, power mechanism, driving connections between said power mechanism and said kerf cutter, feeding and guiding mechanism comprising a pair of winding elements, flexible draft means for cooperating with said elements, and plural speed driving connections for said winding elements whereby either may be driven at one speed while the other is simultaneously driven at another, said connections including controllable friction clutch means whereby either element may revolve in the unwinding direction under frictional resistance while the other is driven in the winding direction.

28. In a mining machine, the combination of a main frame, a kerf cutter, power mechanism, driving connections between said power mechanism and said kerf cutter, feeding and guiding mechanism comprising a pair of winding elements, flexible draft means for cooperating with said elements, and plural speed driving connections for said winding elements whereby either may be driven at one speed while the other is simultaneously driven at another, said connections including controllable friction clutch means whereby one element may revolve in the unwinding direction under frictional resistance while the other is driven in the winding direction at either speed.

29. In a mining machine, the combination of a main frame, a kerf cutter, power mechanism, driving connections between said power mechanism and said kerf cutter, feeding and guiding mechanism comprising a pair of winding elements, flexible draft means for cooperating with said elements, a common shaft on which said elements are loosely mounted, controllable friction clutch means to connect either or both of the elements to the shaft to rotate therewith to wind the draft means, and controllable transmitting connections to drive either or both of said elements in a winding direction at a speed other than that of the shaft.

30. In a mining machine, the combination of a main frame, a kerf cutter, power mechanism, driving connections between said power mechanism and said kerf cutter, feeding and guiding mechanism comprising a pair of winding elements, flexible draft means for cooperating with said elements, a common shaft on which said elements are loosely mounted, controllable friction clutch means to connect either or both of the elements to the shaft to rotate therewith to wind the draft means, and controllable transmitting connections driven from said shaft to drive either or both of said elements in a winding direction at a speed other than that of the shaft.

31. In a mining machine, the combination of a main frame, a kerf cutter, power mechanism, driving connections between said power mechanism and said kerf cutter, feeding and guiding mechanism comprising a pair of winding elements, flexible draft means for cooperating with said elements, a common shaft on which said elements are loosely mounted, controllable friction clutch means to connect either or both of the elements to the shaft to rotate therewith to wind the draft means, and controllable transmitting connections to drive either or both of said elements in a winding direction at a speed other than that of the shaft, said elements being driveable simultaneously one at each speed.

32. In a mining machine, the combination of a main frame, a kerf cutter, power mechanism, driving connections between said power mechanism and said kerf cutter, feeding and guiding mechanism comprising a pair of winding elements, flexible draft means for cooperating with said elements, driving connections for said elements including friction clutch means to cause the rotation of either or the simultaneous rotation of both in the winding direction, and reduction gearing operable to cause one of said elements to rotate at a different winding speed from the other and simultaneously therewith.

33. In a mining machine, the combination of a main frame, a kerf cutter, power mechanism, driving connections between said power mechanism and said kerf cutter, a pair of parallel shafts one of which is adapted to be driven from said power mechanism, reduction gearing comprising intermeshing gears mounted on said shafts, a pair of winding elements mounted on one of said shafts, friction clutch means operable to connect said winding elements to their shaft to be driven thereby in a winding direction without the intervention of the reduction gearing, and means operable to effect the drive of said winding elements in the winding direction at reduced speed through said reduction gearing.

34. In a mining machine, the combination of a main frame, a kerf cutter, power mechanism, driving connections between said power mechanism and said kerf cutter, a pair of parallel shafts one of which is adapted to be driven from said power mechanism, reduction gearing comprising intermeshing gears mounted on said shafts, a pair of winding elements mounted on one of said shafts, friction clutch means operable to connect said winding elements to their shaft to be driven thereby in a winding direction without the intervention of the reduction gearing, means operable to effect the drive of said winding elements in the winding direction at reduced speed through said reduction gearing, and means external to the winding element driving connections for braking one of said elements while either is driven.

35. In a mining machine, the combination of a main frame, a kerf cutter, power mechanism, driving connections between said power mechanism and said kerf cutter, a pair of parallel shafts one of which is adapted to be driven from said power mechanism, reduction gearing comprising intermeshing gears mounted on said shafts, a pair of winding elements mounted on one of said shafts, friction clutch means operable to connect said winding elements to their shaft to be driven thereby in a winding direction without the intervention of the reduction gearing, means operable to effect the drive of said winding elements in the winding direction at reduced speed through said reduction gearing, and means external to the winding element driving connections for braking one of said elements while either is driven at either speed.

36. In a mining machine, the combination of a main frame, a kerf cutter, power mechanism, driving connections between said power mechanism and said kerf cutter, a horizontally extending shaft, a winding element on said shaft, fast and slow speed driving connections for said winding element driven from said power mechanism, each of said driving connections including a separate friction clutch on said shaft, and independent means for controlling said clutches.

37. In a mining machine, the combination of a main frame, a kerf cutter, power mechanism, driving connections between said power mechanism and said kerf cutter, a horizontally extending shaft, a winding element on said shaft, fast and slow speed driving connections for said winding element driven from said power mechanism, each of said driving connections including a separate friction clutch on said shaft, and independent means for controlling said clutches, said connections also including positive clutch members and control means therefor.

38. In a mining machine, the combination of a main frame, a kerf cutter, power mechanism, driving connections between said power mechanism and said kerf cutter, a horizontally extending shaft, a winding element on said shaft, fast and slow speed driving connections for said winding element driven from said power mechanism, each of said driving connections including a separate friction clutch on said shaft, and independent means for controlling said clutches, and brake means for said winding element external to said connections.

39. In a mining machine, the combination of a main frame, a kerf cutter, power mechanism, driving connections between said power mechanism and said kerf cutter, a horizontally extending shaft, a winding element on said shaft, fast and slow speed driving connections for said winding element driven from said power mechanism, each of said driving connections including a separate friction clutch on said shaft, independent means for controlling said clutches, and a second winding element on said shaft and controllable through one of said friction clutches.

40. In a mining machine, the combination of a main frame, a kerf cutter, power mechanism, driving connections between said power mechanism and said kerf cutter, a horizontally extending shaft, a winding element on said shaft, a countershaft parallel to said winding element shaft, a slow speed drive for said winding element including intermeshing gears on the two shafts, a friction clutch on the winding element shaft for controlling said slow speed drive, a fast speed drive for said winding element including a second friction clutch on said winding element shaft, transmitting connections between the power mechanism and the winding element drives, and independent means for controlling said clutches.

41. In a mining machine, the combination of a main frame, a kerf cuttter, power mechanism, driving connections between said power mechanism and said kerf cutter, a horizontally extending shaft, a winding element on said shaft, a countershaft parallel to said winding element shaft, a slow speed drive for said winding element including intermeshing gears on the two shafts, a friction clutch on the winding element shaft for controlling said slow speed drive, a fast speed drive for said winding element including a second friction clutch on said winding element shaft, transmitting connections between the power mechanism and the winding element drives, and independent means for controlling said clutches, the winding element drive connections also including positive clutch members and control means therefor.

42. In a mining machine, the combination of a main frame, a kerf cutter, power mechanism, driving connections between said power mechanism and said kerf cutter, a horizontally extending shaft, a winding element on said shaft, a countershaft parallel to said winding element shaft, a slow speed drive for said winding element including intermeshing gears on the two shafts, a friction clutch on the winding element shaft for controlling said slow speed drive, a fast speed drive for said winding element including a second friction clutch on said winding element shaft, transmitting connections between the power mechanism and the winding element drives, independent means for controlling said clutches, and brake means for said winding element external to its driving connections.

43. In a mining machine, the combination of a main frame, a kerf cutter, power mechanism, driving connections between said power mechanism and said kerf cutter, a horizontally extending shaft, a winding element on said shaft, a countershaft parallel to said winding element shaft, a slow speed drive for said winding element including intermeshing gears on the two shafts, a friction clutch on the winding element shaft for controlling said slow speed drive, a fast speed drive for said winding element including a second friction clutch on said winding element shaft, transmitting connections between the power mechanism and the winding element drives, independent means for controlling said clutches, and a second winding element coaxial with the first and controllable through one of said clutches.

44. In a mining machine, the combination of a main frame, a kerf cutter, power mechanism, driving connections between said power mechanism and said kerf cutter, feeding and guiding mechanism comprising two winding drums disposed side by side, a winding rope for each drum, a shaft common to both drums upon which said drums are loosely mounted, driving means fixed to said drum shaft between said drums, a connection between said driving means and said power means, direct and indirect connections between said driving means and said drums to effect the rotation of either or the simultaneous rotation of both of said drums in a rope winding direction at either of two speeds.

45. In a mining machine, the combination of a main frame, a kerf cutter, power mechanism, driving connections between said power mechanism and said kerf cutter, feeding and guiding mechanism comprising a pair of winding elements, flexible draft means for cooperating with said elements, and plural speed driving connections for each of said winding elements including independently operable control mechanism for each of said winding elements whereby either may be driven at a relatively fast or at a relatively slow speed while the other is simultaneously driven at a speed corresponding to that of the first or at a different speed in the winding direction.

46. In a mining machine, the combination of a main frame, a kerf cutter, power mechanism, driving connections between said power mechanism and said kerf cutter, feeding and guiding mechanism comprising a pair of winding elements, flexible draft means for cooperating with said elements, and plural speed driving connections for said winding elements whereby either may be driven at a relatively fast or at a relatively slow speed while the other is simultaneously driven at a speed corresponding to that of the first or at a different speed in the winding direction, said connections including controllable friction clutch means whereby either element may revolve in the unwinding direction under frictional resistance while the other is driven in the winding direction.

47. In a mining machine, the combination of a main frame, a kerf cutter, power mechanism, driving connections between said power mechanism and said kerf cutter, feeding and guiding mechanism comprising a pair of winding elements, flexible draft means for cooperating with said elements, and plural speed driving connections for said winding elements whereby either may be driven at a relatively fast or at a relatively slow speed while the other is simultaneously driven at a speed corresponding to that of the first or at a different speed in the winding direction, said connections including controllable friction clutch means whereby one element may revolve in the unwinding direction under frictional resistance while the other is driven in the winding direction at either speed.

48. In a mining machine, a drive shaft, a clutch comprising a driving member positively rotated by said drive shaft and a driven member adapted to be rotated by said driving member, a winding drum co-axial with said clutch, a reduction gearing unit, means for engaging said drum directly with said driven member and means for interposing said reduction gearing unit between said drum and said driven member, said drum driving connections being alternately operable.

In testimony whereof, I affix my signature.
NILS D. LEVIN.